US011655419B2

(12) United States Patent
Nicholson

(10) Patent No.: US 11,655,419 B2
(45) Date of Patent: *May 23, 2023

(54) COMPOSITIONS AND METHODS FOR IMPROVED HANDLING AND COMBUSTION OF PETROLEUM PITCH

(71) Applicant: MARATHON PETROLEUM COMPANY LP, Findlay, OH (US)

(72) Inventor: Jeffrey Allen Nicholson, Lexington, KY (US)

(73) Assignee: MARATHON PETROLEUM COMPANY LP, Findlay, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 17/713,428

(22) Filed: Apr. 5, 2022

(65) Prior Publication Data

US 2022/0228069 A1 Jul. 21, 2022

Related U.S. Application Data

(63) Continuation of application No. 16/553,352, filed on Aug. 28, 2019.

(60) Provisional application No. 62/749,263, filed on Oct. 23, 2018.

(51) Int. Cl.
*C10C 3/14* (2006.01)
*C10C 3/08* (2006.01)
*C10L 5/36* (2006.01)
*C10L 5/40* (2006.01)

(52) U.S. Cl.
CPC ............... *C10C 3/14* (2013.01); *C10C 3/08* (2013.01); *C10L 5/366* (2013.01); *C10L 5/406* (2013.01); *C10L 2200/04* (2013.01)

(58) Field of Classification Search
CPC ............. C10C 3/08; C10C 3/14; C10L 5/366
See application file for complete search history.

(56) References Cited

U.S. PATENT DOCUMENTS

| 2,850,436 | A | * | 9/1958 | Beuther | C10C 3/06 208/103 |
| 4,073,625 | A | | 2/1978 | Kiritani et al. | |
| 4,082,823 | A | | 4/1978 | Augustine et al. | |
| 8,193,401 | B2 | | 6/2012 | McGehee et al. | |
| 2017/0114281 | A1 | * | 4/2017 | Gupta | B01J 2/006 |
| 2018/0112303 | A1 | * | 4/2018 | Antony | C09D 1/00 |
| 2020/0123449 | A1 | | 4/2020 | Nicholson | |

FOREIGN PATENT DOCUMENTS

FR 2478122 9/1981
WO 2009147360 12/2009

* cited by examiner

*Primary Examiner* — Ellen M McAvoy
*Assistant Examiner* — Ming Cheung Po
(74) *Attorney, Agent, or Firm* — Womble Bond Dickinson (US) LLP

(57) ABSTRACT

This alternative fuel is a reclaimed waste product which has a solid, particulate consistency at ambient temperature. The fuel comprises a composite of petroleum pitch and a powder coating. The powder coating penetrates into the surface of the pitch. The powder coating is recycled ash, pulverized coal, or pulverized petroleum coke.

7 Claims, 2 Drawing Sheets

200

202
Applying an ignitable coating to an outer surface of selected petroleum pitch forms and at least partially penetrate the outer surface during solidification of the selected petroleum pitch forms so as to increase the ignition surface area of the selected petroleum pitch forms.

204
Providing the selected petroleum pitch forms with increased ignition surface area to a combustion chamber.

206
Combusting the selected petroleum pitch forms with increased ignition surface area either singly or as an additive in coal combustion

FIG. 2

COMPOSITIONS AND METHODS FOR IMPROVED HANDLING AND COMBUSTION OF PETROLEUM PITCH

CROSS REFERENCE TO RELATED APPLICATION

The present patent application is a continuation of U.S. Non-Provisional application Ser. No. 16/553,352, filed Aug. 28, 2019, titled "SOLIDIFICATION TECHNIQUES FOR LOW SOFTENING POINT PETROLEUM PITCH," which claims priority to and the benefit of U.S. Provisional Application No. 62/749,263, filed Oct. 23, 2018, titled "SOLIDIFICATION TECHNIQUES FOR LOW SOFTENING POINT PETROLEUM PITCH," each of which is incorporated herein by reference in its entirety.

TECHNICAL FIELD

This disclosure relates to using petroleum pitch as a fuel. More specifically, the disclosure relates to a composite of petroleum pitch and a recyclable powder coating, a composite of petroleum pitch and combustible powder coating, and methods for producing and using the composites.

BACKGROUND

The industry has a long-standing need to expand the use of lower softening point petroleum pitch. Solidification of the pitch is not necessarily the issue. In fact, soft pitch will solidify on its own. Rather, the problem is keeping the pitch from clumping together, balling up, or sticking to itself. The desired purpose is to be able to use the pitch as a fuel source. Coal fired power facilities, in particular, could benefit from using the composite of this disclosure.

SUMMARY

This disclosure includes a number of different embodiments for using powder coatings to prevent pitch from sticking or clumping. One embodiment adds the powder coating during the cooling phase of pitch solidification. This allows the powder coating to penetrate more deeply into the pitch. The reclaimed waste product has a solid, particulate consistency at ambient temperature comprising a composite of petroleum pitch and a powder coating. The pitch is lower softening point petroleum pitch. More specifically, the pitch is solvent deasphalted (SDA) petroleum pitch. The powder coating is recycled ash, pulverized coal, or pulverized petroleum coke.

One embodiment uses powdered coal or ash from the coal burning industry. Ash is produced when coal is burned. Approximately 20% of coal falls out as ash when burned. This ash must be disposed of properly. By taking this ash and adding it to petroleum pitch, one does not produce more net ash. The reclaimed ash simply falls back out when the pitch is burned. The pitch itself produces little to not ash at all.

In certain embodiments, powdered coal is the preferred coating for pitch because it will penetrate the surface of the pitch and pre-ignite in the combustion chamber of the power plant. This will help with better combustion and more complete burning of the pitch. This is done by increasing the surface area of the pitch to initiate combustion and enhance better burn of the fuel. Ash would not have the same effect, however there are some benefits to ash in that it is a waste product of the coal industry.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

FIG. 2 schematically illustrates a method for increasing the surface area of a petroleum pitch form by applying an ignitable coating to an outer surface of a pitch form, according to an embodiment of the disclosure.

DETAILED DESCRIPTION

Figure 1:
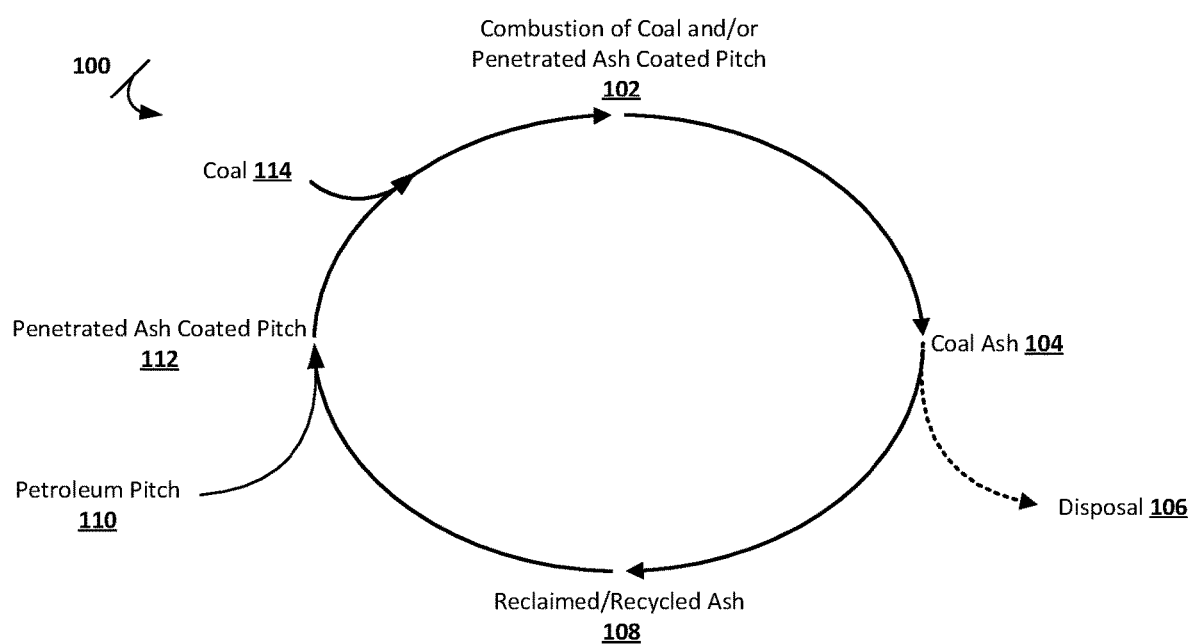
FIG. 1 schematically illustrates a recyclable use of a reclaimed ash as a powder coating for a lower softening point petroleum pitch, according to an embodiment.

The present disclosure describes various embodiments related to compositions, and methods for application of a powdered coated, petroleum pitch fuel for use in coal fired combustion units either singly or as a coal additive.

The embodiments of this disclosure will allow penetration into the coal fired power sector fuel market by providing a way to solidify solvent deasphalted (SDA) pitch and prevent clumping for improved performance (see FIG. 1). Recycled waste ash (108), pulverized coal, or petroleum coke is used as a penetrating dust coating. In a preferred embodiment, the powder coating is coal ash (104). As previously discussed, the powder coating (108) penetrates the surface of the pitch (110). Preferably, the product is fuel (112) in the form of a pastille. Alternative forms of the product can be briquettes or flakes. The powder coating, when applied early within the cooling step of the pitch, will partially penetrate the surface of a pastille. Once fully solidified, the low melt SDA pitch fuel will ship as a solid without significant dusting, melting or conglomerating within truck, rail, or barge equipment.

The product is used as a fungible coal additive which can be utilized within common coal handling equipment such as hoppers, conveyers, and pulverizers. In certain embodiments, this disclosure will reduce ash generation (104) within the coal fired sector. For an equivalent heat demand, the use of recycled ash (108), sourced from the power plant itself with the pitch (110), will produce less total ash (104) when using the SDA pitch as a coal additive (112). The use of a penetrated ash coating (108) will prevent gumming of the petroleum pitch (110) during the pulverizing, preheat, and fuel eduction steps.

Embodiments of the disclosure will provide flame stabilization via early ignition when the SDA pitch is coated with pulverized coal (See FIG. 2). The use of a penetrated coal powder coating will also prevent gumming of petroleum pitch during pulverizing, preheat, and fuel eduction steps (202). Additionally, the coal coating will provide increased surface area for the SDA pitch (202) which will increase the ignition surface area for a higher Btu content solidified SDA pitch (206). The fuel will then burn earlier and hotter thus stabilizing the flame and provide more thorough combustion of the coal fuel balance (204). The use of a powder coating to solve dusting, melting, and conglomerating issues associated with logistics will avoid and an alternative logistics solution which would require an increase to the pitch softening point. This use of powder coating decreases the deasphalted oil (DAO) quality within the SDA Unit and avoids the financial penalties within downstream hydrotreating and fluid catalytic cracking (FCC) units. Deasphalted oil (DAO) is the primary product generated in the SDA Unit and its physical properties are tightly controlled to avoid contaminants.

These embodiments enhance the ability to provide additional outlets for petroleum pitch via a new solidification process and will open opportunities for low capital expenditure (CAPEX) bottom of the barrel upgrading. With the new International Marine Organization rules, costs associated with low sulfur cutter stocks such as ultra-low sulfur diesel (ULSD) are expected to increase and high sulfur pitch/asphalt/vacuum tower bottoms (VTBs) prices are expected to decrease. Removing sulfur from SDA pitch is not economically feasible without installation of high CAPEX, traditional refining techniques such as delayed coking. A lower CAPEX, faster installation option for bottoms upgrading is provided with SDA/Residuum Oil Supercritical Extraction (ROSE) technologies. Providing an outlet market for pitch will enable smaller refineries which cannot hurdle the economies of scale associated with coker CAPEX providing an alternative option to produce high quality DAO feed for FCC/Hydrocracker units via low CAPEX SDA/ROSE installations.

The advantages of this disclosure are noted. Currently any issues associated with melting or conglomeration of petroleum pitch is handled by producing a higher softening point product. This in turn produces lower quality DAO. By using penetrated powder coating, the logistical issues are resolved, and low melt point SDA pitch can continue to be produced without downgrading DAO quality. Also, by solidifying in 2×4 mm pastilles versus larger briquette type product, the fuel will have a shorter residence time within the power plant's pulverizers, thus reducing potential melt and conglomeration risk. The solidified pitch is also superior with a 35% higher Btu content, lower ash content, lower mercury content when compared to coal. Once the solidified fuel market is developed, bottom of the barrel upgrading options for low CAPEX SDA/ROSE installations will be very competitive versus delayed coker applications.

The above detailed description of the present disclosure is given for explanatory purposes. It will be apparent to those skilled in the art that numerous changes and modifications can be made without departing from the scope of the disclosure. Accordingly, the whole of the foregoing description is to be construed in an illustrative and not a limitative sense, the scope of the invention being defined solely by the appended claims.

These embodiments may be described and disclosed. In the following description, numerous details are set forth in order to provide a thorough understanding of the various embodiments. In other instances, well-known processes, devices, and systems may not have been described in particular detail in order not to unnecessarily obscure the various embodiments. Additionally, illustrations of the various embodiments may omit certain features or details in order to not obscure the various embodiments.

The description may use the phrases "in certain embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous. The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "removing," "removed," "reducing," "reduced," or any variation thereof, when used in the claims and/or the specification includes any measurable decrease of one or more components in a mixture to achieve a desired result. The use of the words "a" or "an" when used in conjunction with any of the terms "comprising," "including," "containing," or "having," in the claims or the specification may mean "one," but it is also consistent with the meaning of "one or more," "at least one," and "one or more than one." The terms "wt. %", "vol. %", or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

I claim:

1. A method of utilizing a petroleum pitch fuel with a recyclable powder coating, the method comprising:
   applying a recyclable powder ash coating positioned to coat an outer surface of a plurality of selected petroleum pitch forms and at least partially penetrate the outer surface of the petroleum pitch forms during solidification, to produce a penetrated ash coated petroleum pitch form;
   providing the penetrated ash coated petroleum pitch form as a combustion fuel;
   combusting the penetrated ash coated petroleum pitch form either singly or in combination with coal;
   reclaiming the recyclable powder ash coating as a reclaimed ash; and
   applying the reclaimed ash as the recyclable powder ash coating to the outer surface of a plurality of selected petroleum pitch forms, thereby to produce less total ash when combusting recyclable powder coated petroleum pitch fuel.

2. The method of claim 1, wherein the recyclable powder ash coating comprises one or more of a recycled ash, a powdered ash, a recycled waste ash, a reclaimed ash, or a coal ash.

3. The method of claim 1, wherein each of the selected petroleum pitch forms comprises a solvent deasphalted petroleum pitch.

4. The method of claim 1, wherein each of the selected petroleum pitch forms of the fuel comprises one or more of a pastille, a briquette, or a flake.

5. A method of utilizing a petroleum pitch fuel with a recyclable powder coating, the method comprising:
   applying a recyclable powder ash coating positioned to coat an outer surface of a plurality of selected petroleum pitch forms and at least partially penetrate the outer surface of the petroleum pitch forms during solidification, thereby to produce a penetrated ash coated petroleum pitch form, the penetrated ash coated petroleum pitch form also including a solvent deasphalted petroleum pitch;
   providing the penetrated ash coated petroleum pitch form as a combustion fuel;
   combusting the penetrated ash coated petroleum pitch form either singly or in combination with coal;

reclaiming the recyclable powder ash coating as a reclaimed ash; and applying the reclaimed ash as the recyclable powder ash coating to the outer surface of a plurality of selected petroleum pitch forms, thereby to produce less total ash when combusting recyclable powder coated petroleum pitch fuel, the recyclable powder ash coating comprising one or more of a recycled ash, a recycled waste ash, a reclaimed ash or a coal ash.

6. The method of claim 5, wherein the petroleum pitch forms of the fuel comprise one or more of a pastille, a briquette, or a flake.

7. A method of utilizing a petroleum pitch fuel with a recyclable powder coating, the method comprising:

applying a recyclable powder ash coating positioned to coat an outer surface of a plurality of selected petroleum pitch forms and at least partially penetrate the outer surface of the petroleum pitch forms during solidification, thereby to produce a penetrated ash coated petroleum pitch form, each of the selected petroleum pitch forms of the fuel comprises one or more of a pastille, a briquette, or a flake;

providing the penetrated ash coated petroleum pitch form as a combustion fuel;

combusting the penetrated ash coated petroleum pitch form either singly or in combination with coal;

reclaiming the recyclable powder ash coating as a reclaimed ash; and applying the reclaimed ash as the recyclable powder ash coating to the outer surface of a plurality of selected petroleum pitch forms, thereby to produce less total ash when combusting recyclable powder coated petroleum pitch fuel, the recyclable powder ash coating comprises one or more of a recycled ash, a powdered ash, a recycled waste ash, a reclaimed ash, or a coal ash.

* * * * *